United States Patent
Kogure

(10) Patent No.: US 9,777,776 B2
(45) Date of Patent: Oct. 3, 2017

(54) JOINT STRUCTURE AND POWER STEERING DEVICE

(71) Applicant: Showa Corporation, Gyoda-shi (JP)

(72) Inventor: Akihiro Kogure, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/015,914

(22) Filed: Feb. 4, 2016

(65) Prior Publication Data

US 2016/0146262 A1    May 26, 2016

Related U.S. Application Data

(63) Continuation of application No. PCT/JP2013/071676, filed on Aug. 9, 2013.

(51) Int. Cl.
  *F16D 3/50* (2006.01)
  *B62D 5/04* (2006.01)
  (Continued)

(52) U.S. Cl.
  CPC .............. *F16D 3/50* (2013.01); *B62D 3/10* (2013.01); *B62D 5/0409* (2013.01);
  (Continued)

(58) Field of Classification Search
  CPC .................................... F16D 3/50; B62D 3/10
  See application file for complete search history.

(56) References Cited

U.S. PATENT DOCUMENTS 6,394,248 B1   5/2002  Monahan et al.
2005/0072620 A1*  4/2005  Joushita .................... F16D 3/68
                                                    180/444

(Continued)

FOREIGN PATENT DOCUMENTS

CN        101213385 A      7/2008
CN        201090620 Y      7/2008
(Continued)

OTHER PUBLICATIONS

International Search Report mailed Sep. 10, 2013 for the corresponding PCT Application No. PCT/JP2013/071676.
(Continued)

*Primary Examiner* — Tony Winner
(74) *Attorney, Agent, or Firm* — Leason Ellis LLP

(57) ABSTRACT

A joint structure includes first and second engagement members, and an elastic member. The first engagement member includes a first body and a first engagement claw. The second engagement member includes a second body and a second engagement claw. The elastic member is disposed between the first and second engagement portions in a circumferential direction. When a relative rotation angle between the first and second engagement members is less than a predetermined angle, the first and second engagement claws are not in direct contact with each other in the circumferential direction, and a rotational force is transmitted through the elastic member while the elastic member is being elastically deformed. When the relative rotation angle is equal to the predetermined angle, the first and second engagement claws are in direct contact with each other in the circumferential direction.

11 Claims, 18 Drawing Sheets

(51) Int. Cl.
  *F16D 3/12* (2006.01)
  *F16D 3/66* (2006.01)
  *F16D 3/68* (2006.01)
  *B62D 3/10* (2006.01)
  *F16D 3/02* (2006.01)

(52) U.S. Cl.
  CPC ............ *B62D 5/0421* (2013.01); *F16D 3/02* (2013.01); *F16D 3/12* (2013.01); *F16D 3/66* (2013.01); *F16D 3/68* (2013.01)

(56) References Cited

U.S. PATENT DOCUMENTS

| | | | | |
|---|---|---|---|---|
| 2006/0169528 | A1* | 8/2006 | Yuasa | B62D 5/0409 180/444 |
| 2007/0158131 | A1 | 7/2007 | Iwasa et al. | |
| 2011/0240399 | A1* | 10/2011 | Suzuki | B62D 5/0409 180/444 |

FOREIGN PATENT DOCUMENTS

| | | |
|---|---|---|
| CN | 101260909 A | 9/2008 |
| JP | 56-015827 U | 7/1979 |
| JP | 01-074731 U | 5/1989 |
| JP | 01-120428 A | 5/1989 |
| JP | 2005-212623 A | 8/2005 |
| JP | 2005-306141 A | 11/2005 |
| JP | 2007-040315 A | 2/2007 |
| JP | 2007-082349 A | 3/2007 |
| JP | 2008-260471 A | 10/2008 |

OTHER PUBLICATIONS

Office Action dated Aug. 16, 2016 for the corresponding Japanese Patent Application No. 2015-530648.
Office Action dated Apr. 6, 2017 for the corresponding Chinese Patent Application No. 201380078843.7.

\* cited by examiner

<X1-X1 cross-sectional view. Relative rotation angle $\theta = 0°$>

<X2-X2 cross-sectional view. Relative rotation angle $\theta = 0°$>

<X3-X3 cross-sectional view. Relative rotation angle $\theta = 0°$>

JOINT STRUCTURE AND POWER STEERING DEVICE

CROSS REFERENCE TO RELATED APPLICATION

This is a continuation of International Application No. PCT/JP2013/071676 filed on Aug. 9, 2013, the entire disclosure of which is incorporated herein by reference.

BACKGROUND

1. Technical Field

The present invention relates to a joint structure and a power steering device.

2. Related Art

Electric power steering devices are known to use electric motors to assist (aid) steering force. Known types of assisting methods include pinion-assist type, double pinion-assist type, rack-assist type, and column-assist type.

For example, the pinion-assist type includes: a worm wheel fixed to a pinion shaft; and a worm engaged with the worm wheel and rotatable by a motor. A configuration oftentimes used to connect the output shaft of the motor (motor shaft) and the worm to each other is such a configuration that a coupling integrally molded or press-fitted to the motor shaft and having a spline hole is spline-connected to a spline shaft portion molded integrally to the worm. In order to facilitate the spline connection in this configuration, a proper gap (space) is formed between the spline hole and the spline shaft portion.

The gap, however, can cause a backlash to occur between the coupling and the spline shaft portion. Specifically, there is a possibility of the coupling and the spline shaft portion wobbling in a circumferential direction (rotating direction), causing rattling noise (tapping noise) to be generated at the time when the motor starts rotation or reverses rotation. Additionally, at the time when the motor starts rotation or reverses rotation, there is an abrupt increase in torque that is being transmitted, causing the assisting force to fluctuate. This presents a possibility of a driver feeling uncomfortable.

In order to prevent rattling noise from occurring and prevent an abrupt increase in the torque, a joint that includes an elastic member is proposed (see patent literature 1 (JP-A-2005-306141) and patent literature 2 (JP-A-2005-212623)). A specific method is to sandwich the elastic member between metal members such as couplings and to transmit the torque while deforming the elastic member under compressive force.

SUMMARY OF THE INVENTION

In patent literatures 1 and 2, however, the configuration of sandwiching the elastic member between metal members such as couplings is a configuration that involves an increase in the level of deformation of the elastic member as rotational force (torque) being transmitted increases. In this configuration, torque is repeatedly input to the elastic member, resulting in an excessive level of torque, and there is a possibility of damage to the elastic member.

In view of the above-described circumstances, the present invention has an object to provide a joint structure and a power steering device that make the rotational force being transmitted increase gradually and that are higher in durability.

A joint structure according to the present invention includes: a first engagement member integral to a first rotation shaft; a second engagement member integral to a second rotation shaft; and an elastic member having an elasticity and disposed between the first engagement member and the second engagement member to transmit a rotational force between the first engagement member and the second engagement member. The first engagement member includes a first body integral to the first rotation shaft, and one or more first engagement portions extending from the first body. The second engagement member includes a second body integral to the second rotation shaft, and one or more second engagement portions extending from the second body. The elastic member is disposed between the first engagement portion and the second engagement portion in a circumferential direction. When a relative rotation angle between the first engagement member and the second engagement member is less than a predetermined angle, the first engagement portion and the second engagement portion are not in direct contact with each other in the circumferential direction, and the rotational force is transmitted through the elastic member while the elastic member is being elastically deformed. When the relative rotation angle is equal to the predetermined angle, the first engagement portion and the second engagement portion are in direct contact with each other in the circumferential direction.

In this configuration, when the relative rotation angle between the first engagement member and the second engagement member is less than the predetermined value, the first engagement portion and the second engagement portion are not in direct contact with each other in the circumferential direction, and the rotational force is transmitted between the first engagement portion and the second engagement portion through the elastic member while the elastic member is being elastically deformed. This configuration eliminates rattling noise between the first engagement portion and the second engagement portion at the time when, for example, the first rotation shaft starts rotation or reverses rotation. Furthermore, since the elastic member is elastically deformable and absorbs change in the rotational force, the rotational force being transmitted does not increase abruptly.

When the relative rotation angle is equal to the predetermined angle, the first engagement portion and the second engagement portion are in direct contact with each other in the circumferential direction, and the rotational force is transmitted through the first engagement portion and the second engagement portion, which are now in direct contact with each other. That is, after the first engagement portion and the second engagement portion are in direct contact with each other, the elastic member is not deformed any further. This configuration ensures that no excessive rotational force (compressive force) is input to the elastic member, keeping the amount of elastic deformation at a smaller level and making the elastic member higher in durability. Thus, there is no need for upsizing the elastic member in an attempt to improve durability.

In the joint structure, the first engagement portion preferably includes: a first holding portion holding the elastic member in an axial direction; and a first direct contact portion in direct contact with the second engagement portion when the relative rotation angle is equal to the predetermined angle.

In this configuration, since the first holding portion holds the elastic member in the axial direction, the elastic member is kept from movement with respect to the first engagement portion in the axial direction, and thus the elastic member is not displaced. When the relative rotation angle is equal to the predetermined angle, the first direct contact portion is in direct contact with the second engagement portion.

In the joint structure, the second engagement portion preferably includes: a second holding portion holding the elastic member in the axial direction; and a second direct contact portion in direct contact with the first engagement portion when the relative rotation angle is equal to the predetermined angle.

In this configuration, since the second holding portion holds the elastic member in the axial direction, the elastic member is kept from movement with respect to the second engagement portion in the axial direction, and thus the elastic member is not displaced. When the relative rotation angle is equal to the predetermined angle, the second direct contact portion is in direct contact with the first engagement portion.

A power steering device according to the present invention includes a joint structure including: a first engagement member integral to a first rotation shaft; a second engagement member integral to a second rotation shaft; and an elastic member including an elasticity and disposed between the first engagement member and the second engagement member to transmit a rotational force between the first engagement member and the second engagement member. The first engagement member includes a first body integral to the first rotation shaft, and one or more first engagement portions extending from the first body. The second engagement member includes a second body integral to the second rotation shaft, and one or more second engagement portions extending from the second body. The elastic member is disposed between the first engagement portion and the second engagement portion in a circumferential direction. When a relative rotation angle between the first engagement member and the second engagement member is less than a predetermined angle, the first engagement portion and the second engagement portion are not in direct contact with each other in the circumferential direction, and the rotational force is transmitted between the first engagement member and the second engagement member through the elastic member while the elastic member is being elastically deformed. When the relative rotation angle is equal to the predetermined angle, the first engagement portion and the second engagement portion are in direct contact with each other in the circumferential direction. The first rotation shaft is an output shaft of a motor configured to generate an assisting force. The second rotation shaft is a transmission member configured to transmit the assisting force to a steering device.

The joint structure and the power steering device discussed above make the rotational force being transmitted increase gradually, and are higher in durability.

DETAILED DESCRIPTION OF THE INVENTION

<<First Embodiment>>

Figure 1:
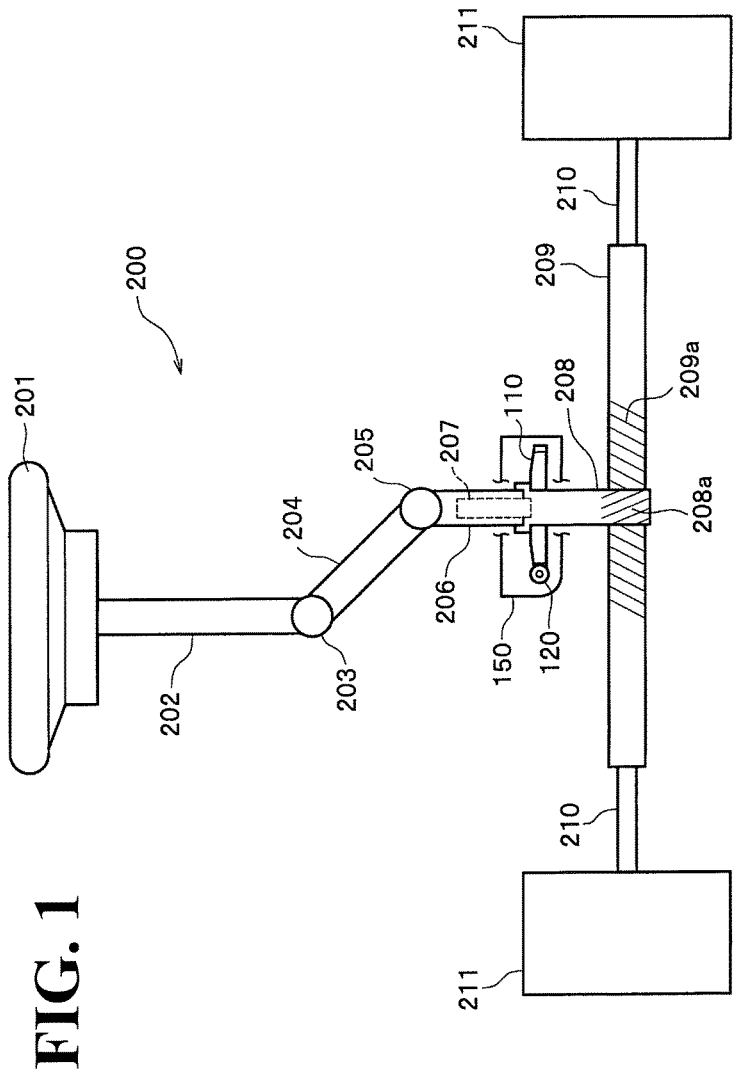
FIG. 1 is a diagram illustrating a configuration of an electric power steering device according to a first embodiment.

A first embodiment of the present invention will be described with reference to FIG. 1 to FIG. 8.

<<Configuration of Electric Power Steering Device>>

An electric power steering device 200 is of the pinion-assist type, in which assisting force (aid force) is input to a pinion shaft 208.

The electric power steering device 200 includes: a steering wheel 201, which is operated by a driver; a steering shaft 202 (steering column), which rotates together with the steering wheel 201; an intermediate shaft 204, which is connected to the steering shaft 202 through a first universal joint 203; an input shaft 206, which is connected to the intermediate shaft 204 through a second universal joint 205; a pinion shaft 208, which is connected to the input shaft 206 through a torsion bar 207 and provided with a pinion 208a, which is formed at the lower end of the pinion shaft 208; and a rack shaft 209, which includes a rack 209a, which is engaged with the pinion 208a. Both ends of the rack shaft 209 are connected to front wheels 211, which are steering wheels, through a tie rod 210.

Figure 2:
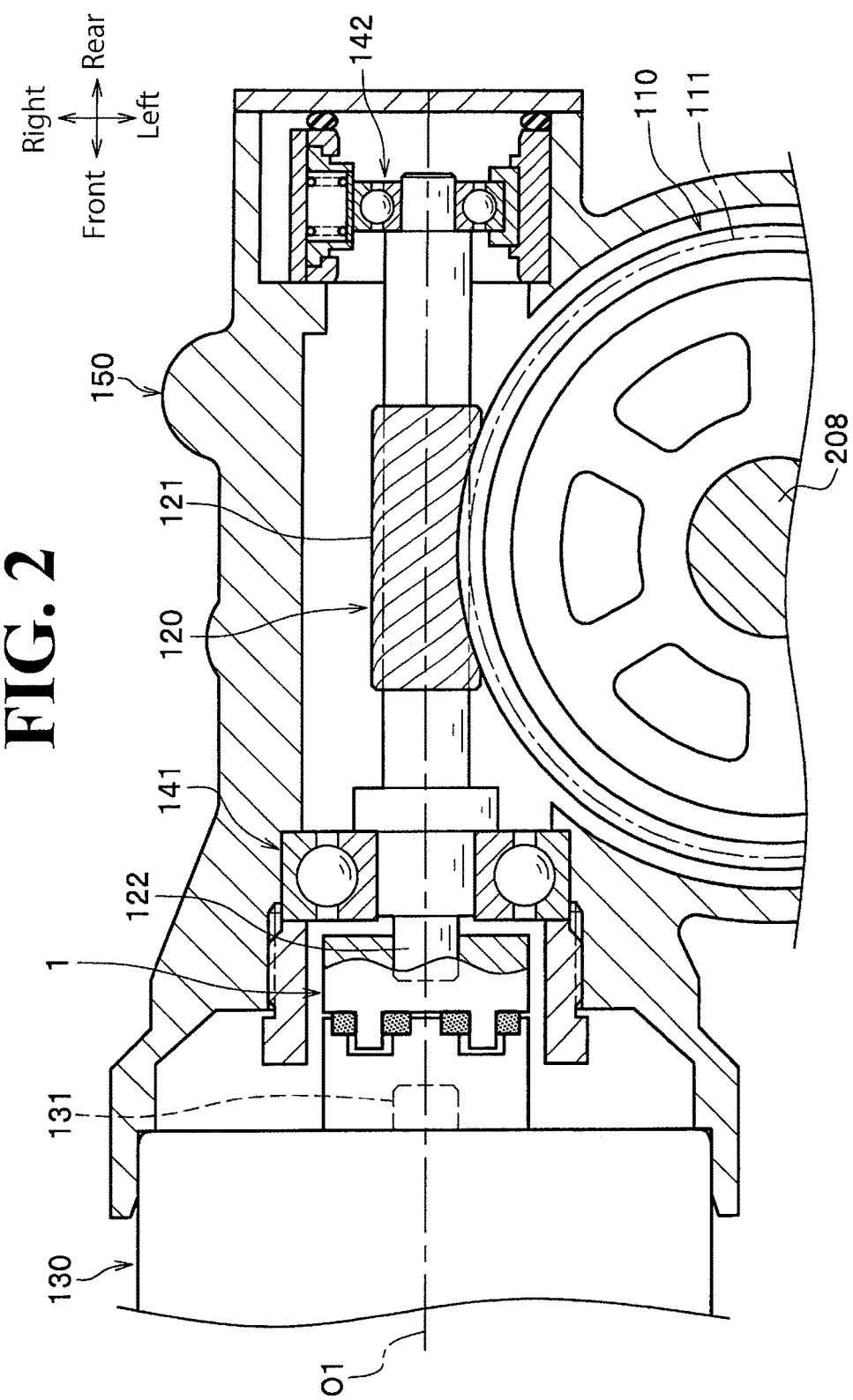
FIG. 2 is a plan cross-sectional view of main portions of the electric power steering device according to the first embodiment.
Figure 3:
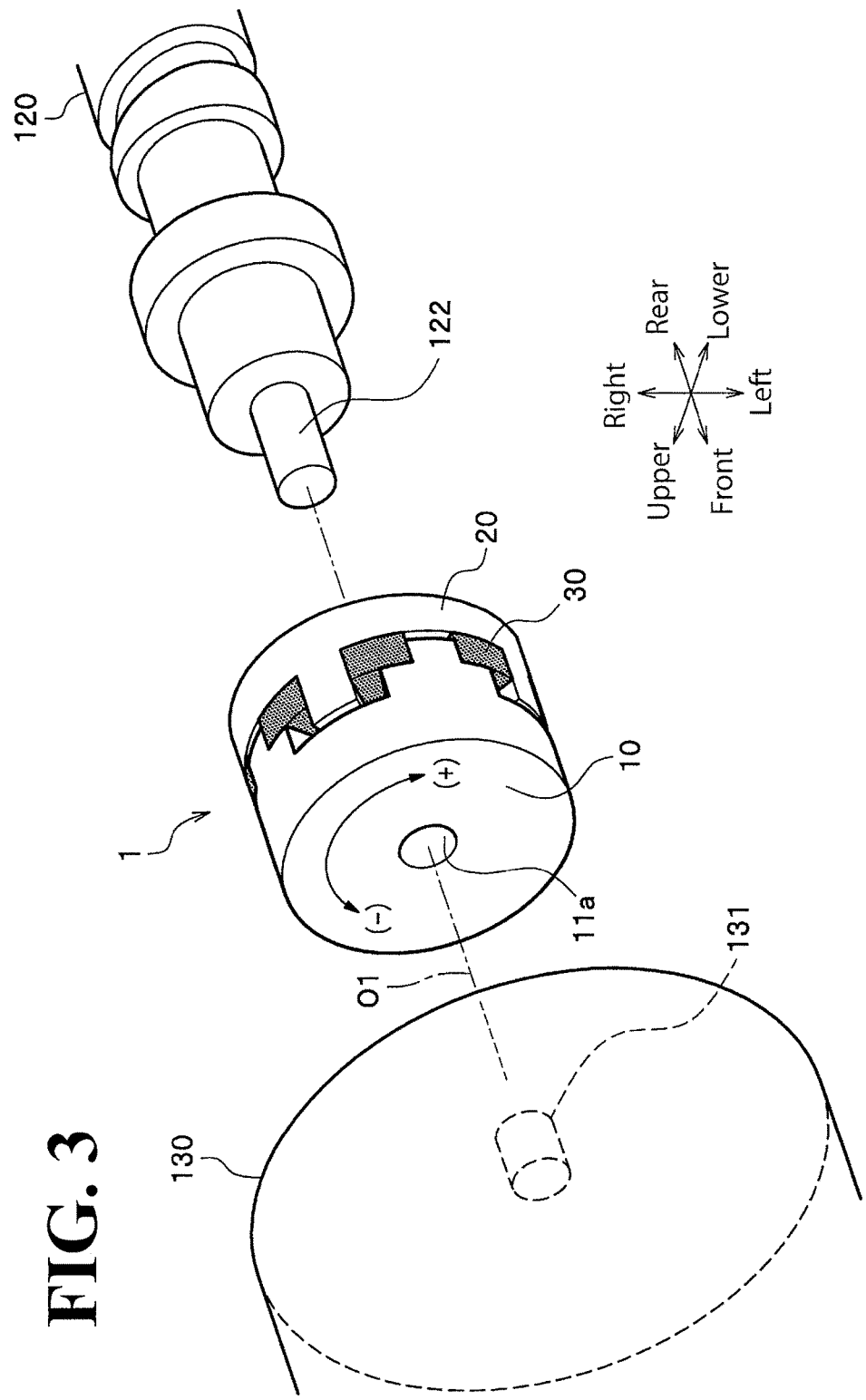
FIG. 3 is a perspective view of a joint structure according to the first embodiment.

As illustrated in FIG. 2, the electric power steering device 200 includes: a worm wheel 110, which is fixed to the pinion shaft 208; a worm 120 (second rotation shaft, transmission member), which is engaged with gear teeth 111 of the worm wheel 110; an electric motor 130, which generates assisting force (motive power); and a joint structure 1, which joints the output shaft 131 (first rotation shaft) of the motor 130 to the worm 120. That is, the worm 120 is a transmission member that transmits the assisting force from the motor 130 to the pinion shaft 208, which is a part of a steerer that steers the front wheel 211.

The worm 120 is an elongated, solid cylindrical portion. At an intermediate portion of the worm 120, the worm 120 includes gear teeth 121, which are engaged with the gear teeth 111 of the worm wheel 110. On the front end side of the worm 120, a spline shaft portion 122, which is spline-connected to a second engagement member 20 described later (see FIG. 4), is formed. The worm 120 is rotatably supported by a housing 150 through a bearing 141, which is on the front side, and a bearing 142, which is on the back side. The bearing 141 and the bearing 142 are made up of radial ball bearings, for example.

<<Configuration of the Joint Structure>>

The joint structure 1 will be described with reference to FIG. 3 to FIG. 8. The joint structure 1 is a structure that joints the output shaft 131 (first rotation shaft) of the motor 130 to the worm 120 (second rotation shaft) in a torque transmittable manner. The joint structure 1 includes: a first engagement member 10 (first coupling), which is fixed to the output shaft 131; a second engagement member 20 (second coupling), which is fixed to the worm 120; and an elastic member 30 (bush), which is disposed between the first engagement member 10 and the second engagement member 20.

<First Engagement Member>

The first engagement member 10 is a member that is integrally fixed to the output shaft 131 of the motor 130 and that is engaged with the second engagement member 20 and/or the elastic member 30.

The first engagement member 10 and the second engagement member 20 are each made of such a hard material that has a higher level of rigidity (elastic coefficient, elastic modulus) than the elastic member 30. Specific examples of the materials of the first engagement member 10 and the second engagement member 20 include metals (including alloy), sintered materials, hard synthetic resins, and ceramics.

This configuration ensures that when a first engagement claw 12 of the first engagement member 10, described later, and a second engagement claw 22 of the second engagement member 20, described later, are in direct contact and engaged with each other, the elastic member 30 is not compressed any further. The first engagement member 10 and the second engagement member 20 integrally rotate to cause torque generated at the motor 130 to be transmitted as it is.

The first engagement member 10 includes a first body 11 and four first engagement claws 12 (first engagement portions), which are integral to the first body 11 and extend rearward from the first body 11. Another possible configuration is that the first body 11 and the first engagement claws 12 are separate members. The number of the first engagement claws 12 is not limited to four, but may be one, two, three, five, or more than five.

<First Engagement Member—First Body>

The first body 11 has a short cylindrical pedestal shape and is a portion to which the output shaft 131 of the motor 130 is connected. On the central axis of the first body 11, a spline hole 11*a* is formed. That is, the output shaft 131 and the spline hole 11*a* are spline-connected to each other, and thus, the first body 11 is fixed and connected to the output shaft 131.

The first body 11 is not limited to the short cylindrical pedestal shape, and other examples include a quadrilateral pedestal shape, a star pedestal shape, and a hemispherical pedestal shape. The method of connecting (method of fixing) the first body 11 and the output shaft 131 to each other is not limited to the spline connecting. Other exemplary methods include a press-fitting method or an integrally molding method. Another possible configuration is that the first body 11 and the output shaft 131 are integral to each other.

<First Engagement Member—First Engagement Claw>

Each of the first engagement claws 12 is an elongated quadrilateral prism piece extending along a rotation axis O1 from the outer circumferential edge of the first body 11 toward the second engagement member 20. The rotation axis O1 is the rotation axis of the first joint structure 1. However, the shape of the first engagement claw 12 is not limited to the elongated quadrilateral prism piece. The four first engagement claws 12 are disposed at equal intervals (90° intervals) in the circumferential direction (rotating direction of the motor 130).

Each first engagement claw 12 includes: a first end portion 13 (first holing portion) on the distal end side (rear side); and a first base end portion 14 (first direct contact portion) on the base end side (front side).

The first end portion 13 is a portion that is at all times in contact with elastic claws 32, described later, in the circumferential direction to hold the elastic claw 32.

Figure 7:
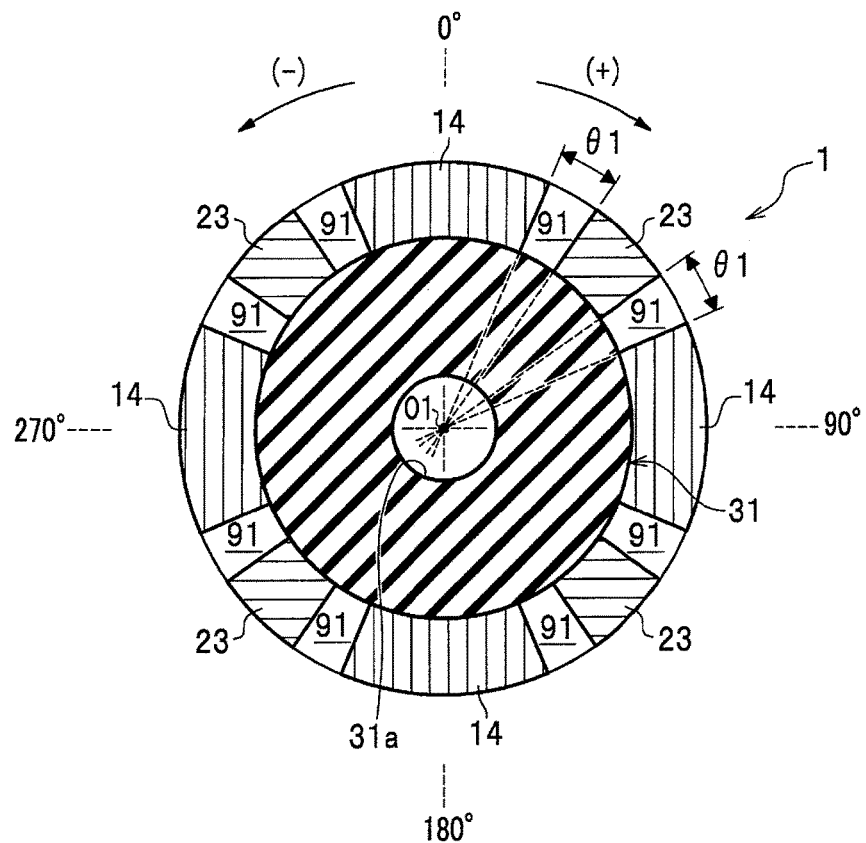
FIG. 7 is a round cross-sectional view of the joint structure according to the first embodiment taken along the line X2-X2 of FIG. 5.
Figure 8:
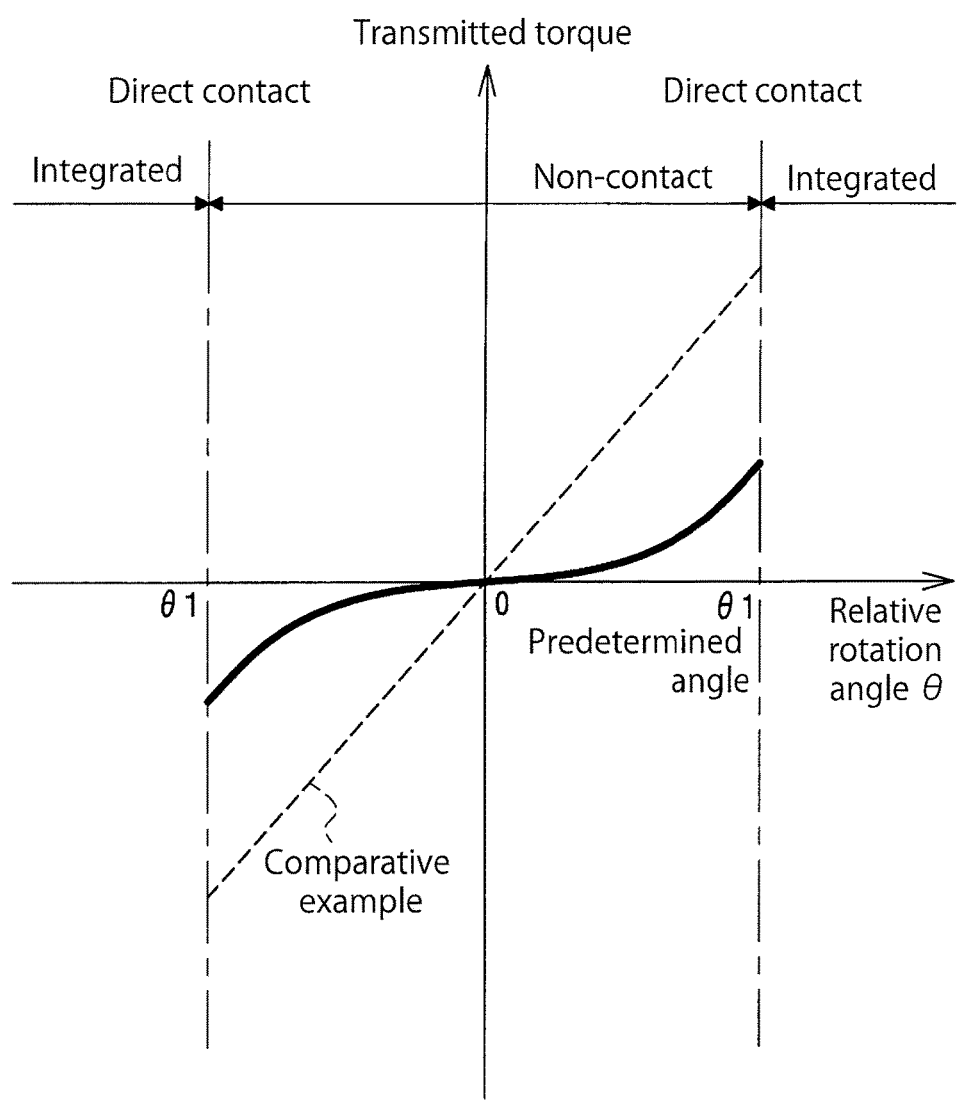
FIG. 8 is a graph of an operation and an effect implemented by the joint structure according to the first embodiment.

The first base end portion 14 is a portion that is in direct contact with a second end portion 23 in the circumferential direction when the rotation axis O1-centered relative rotation angle, $\theta$, between the first engagement member 10 and the second engagement member 20 is equal to a predetermined angle $\theta 1$ (see FIG. 7 and FIG. 8). When the relative rotation angle $\theta$ is equal to the predetermined angle $\theta 1$, the elastic claw 32 is in a state of being compressed and deformed in the circumferential direction.

Figure 5:
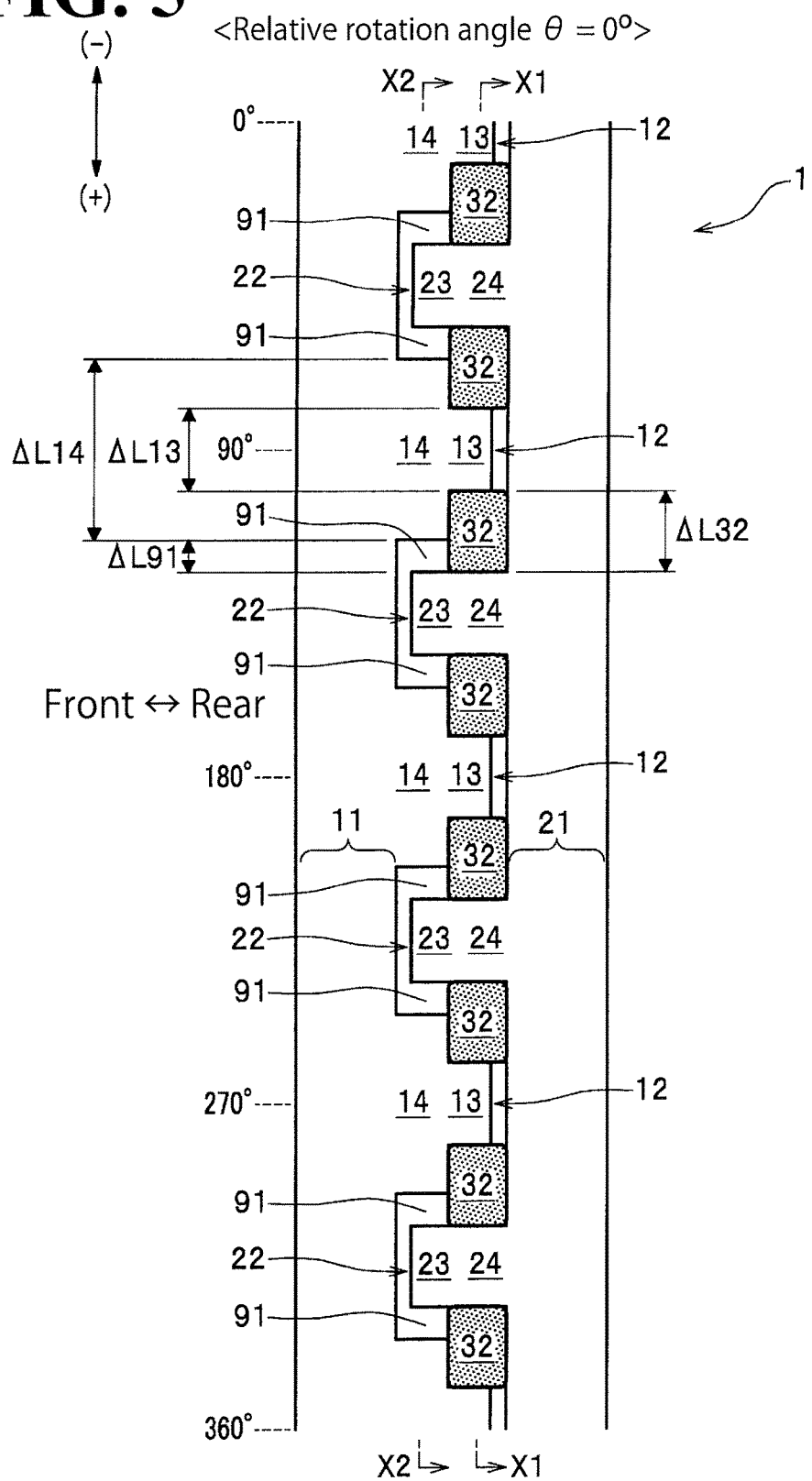
FIG. 5 is a view of the outer surface of the joint structure according to the first embodiment.
Figure 6:
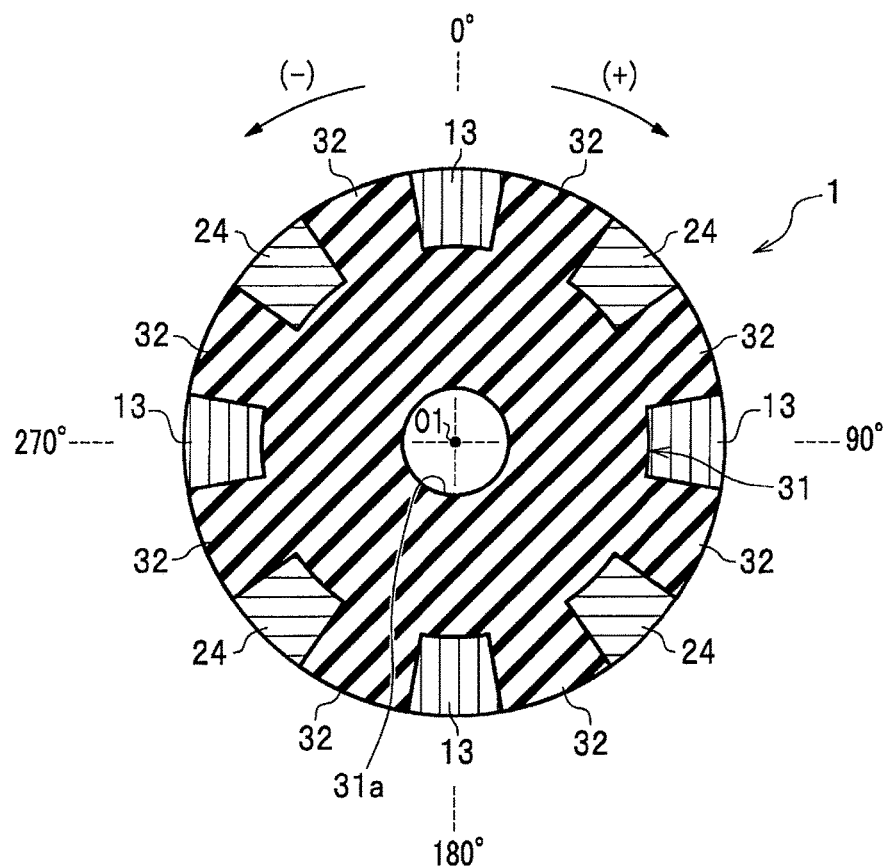
FIG. 6 is a round cross-sectional view of the joint structure according to the first embodiment taken along the line X1-X1 of FIG. 5.

The first base end portion 14 has a circumferential length $\Delta L14$ (width), which is longer than the circumferential length, $\Delta L13$ (width), of the first end portion 13 (see FIG. 5). That is, the both side surfaces of the first engagement claw 12 form a stepped surface. This configuration ensures that the elastic claw 32 is held in the axial direction by being engaged with the first base end portion 14, and frontward displacement of the elastic claw 32 is prevented.

At a relative rotation angle $\theta$ of 0° between the first engagement member 10 and the second engagement member 20, the circumferential length, $\Delta L91$, of a slit 91 (gap, clearance), which is formed between the first base end portion 14 and the second end portion 23 described later, is shorter than the circumferential length, $\Delta L32$, of the elastic claw 32.

<Second Engagement Member>

The second engagement member 20 is a member that is fixed and integral to the spline shaft portion 122 of the worm 120 and that is also engaged with the first engagement member 10 and/or the elastic member 30. The second engagement member 20 has a similar configuration to the first engagement member 10, and description of the second engagement member 20 will be omitted as the description is deemed unnecessary.

The second engagement member 20 includes a second body 21 and four second engagement claws 22 (second engagement portions), which are integral to the second body 21 and extend frontward from the second body 21. Another possible configuration is that the second body 21 and the second engagement claw 22 are separate members. The number of the second engagement claws 22 is not limited to four, but may be one, two, three, five, or more than five.

<Second Engagement Member—Second Body>

The second body 21 has a short cylindrical pedestal shape and is a portion to which the spline shaft portion 122 of the worm 120 is connected. On the central axis of the second body 21, a spline hole 21*a* is formed. That is, the spline shaft portion 122 is spline-connected to the spline hole 21*a*, and thus the second body 21 is fixed and connected to the spline shaft portion 122.

The second body 21 is not limited to the short cylindrical pedestal shape, and other examples include a quadrilateral pedestal shape, a star pedestal shape, and a hemispherical pedestal shape. The method of connecting (method of fixing) the second body 21 and spline shaft portion 122 to each other is not limited to the spline connecting. Other exemplary methods include a press fitting method. Another possible configuration is that the second body 21 and the spline shaft portion 122 are integral to each other.

<Second Engagement Member—Second Engagement Claw>

Each of the second engagement claws 22 is an elongated quadrilateral prism piece extending along the rotation axis O1 from the outer circumferential edge of the second body 21 toward the first engagement member 10. However, the shape of the second engagement claw 22 is not limited to the elongated quadrilateral prism piece. The four second engagement claws 22 are disposed at equal intervals (90° intervals) in the circumferential direction (rotating direction of the motor 130).

Each second engagement claw 22 includes a second end portion 23 on the end side (rear side) and a second base end portion 24 on the base end side (front side). The second end portion 23 is a portion that is in direct contact with the first base end portion 14 when the relative rotation angle θ is equal to the predetermined angle θ1. The second base end portion 24 is a portion that is at all times in contact with the elastic claw 32.

<Elastic Member>

The elastic member 30 is a portion that has an elasticity and that is disposed between the first engagement member 10 and the second engagement member 20. The elastic member 30 is a portion that transmits torque between the first engagement member 10 and the second engagement member 20.

The elastic member 30 is made of such a soft material that has a lower level of rigidity (elastic coefficient (elastic modulus)) than the first engagement member 10 and the second engagement member 20. Specific examples of the material of the elastic member 30 include a synthetic rubber (such as silicon rubber and urethane rubber), a natural rubber, and a soft synthetic resin (urethane, polyester elastomer).

The elastic member 30 includes a cylindrical elastic member body 31 and eight elastic claws 32, which extend outward in the radial direction from rear portions of the outer circumferential surface of the elastic member body 31. Another possible configuration is that the elastic member body 31 and the elastic claw 32 are separate members. The number of the elastic claws 32 is not limited to eight, but can be changed conveniently.

<Elastic Member—Elastic Member Body>

The elastic member body 31 is a portion that is sandwiched between the first body 11 and the second body 21 in the axial direction. The length in the axial direction of the elastic member body 31 is set at approximately twice the length of the elastic claw 32.

A through hole 31a penetrates the elastic member body 31 in the axial direction along the central axis (rotational axis O1) of the elastic member body 31. In the through hole 31a, an elastic member (axial-direction precompression member) to generate precompression in the axial direction may be inserted. Specifically, the elastic member may be disposed in the through hole 31a in a contracted state in the axial direction, and use restoring force to urge rearward (see FIG. 2) the second engagement member 20 and the worm 120, which is integral to the second engagement member 20, so as to make the worm 120 and the worm wheel 110 engage with each other at a predetermined position. Examples of the elastic member include a coil spring and a not-illustrated elastic rod that is made of an elastic material and has an elasticity. Examples of the elastic rod include an elongated cylindrical shape rod and an elongated prism shape rod.

As described above, the elastic rod has an elasticity and thus is readily twistable in the circumferential direction, which makes the first engagement member 10 and the second engagement member 20 readily rotatable relative to each other. It is noted, however, that a configuration without the through hole 31a and the elastic rod is also possible.

<Elastic Member—Elastic Claw>

The elastic claw 32 is a protruding piece formed on the outer circumferential surface of the elastic member main body 31, and is an elongated quadrilateral prism piece extending in the axial direction. The elastic claw 32 is a portion that is sandwiched between the first end portion 13 and the second base end portion 24 in the circumferential direction.

<<Operations and Effects of the Joint Structure (Electric Power Steering System)>>

Operations and effects of the joint structure 1 (electric power steering system 200) will be described.

"Relative Rotation Angle θ=0°"

A case where the relative rotation angle θ is 0° will be described. The state in which the relative rotation angle θ is 0° is a state in which the motor 130 is stationary, in which the elastic member 30 is not compressed in the circumferential direction, and in which the second engagement claw 22 is disposed at an intermediate position between two first engagement claws 12 in the circumferential direction.

In the circumferential direction of a round cross-section (cross-section taken along the line X1-X1) including the elastic claws 32 (see FIG. 5 and FIG. 6), the first end portion 13, the elastic claw 32, the second base end portion 24, the elastic claw 32, the first end portion 13, the elastic claw 32, the second base end portion 32, the second base end portion 24 and so forth are aligned in this order.

In the circumferential direction of a round cross-section (cross-section taken along the line X2-X2) excluding the elastic claws 32 (see FIG. 5 and FIG. 7), the first base end portion 14, the slit 91, the second end portion 23, the slit 91 (gap, clearance), the first base end portion 14, the slit 91, the second end portion 23 and so forth are aligned in this order. That is, the slits 91 are formed between the first base end portions 14 and the second end portions 23 in the circumferential direction.

"0°<Relative Rotation Angle θ<Predetermined Angle θ1"

A case where the motor 130 rotates and "0°<the relative rotation angle θ<the predetermined angle θ1" will be described. In the following description, in FIG. 3 to FIG. 8, when the first engagement portion 10, which is on the motor 130 side, rotates to the right with respect to the second engagement member 20, which is on the worm 120 side, this case will be referred to as "+ (plus) side". When the first engagement portion 10 rotates to the left with respect to the second engagement member 20, which is on the worm 120 side, this case will be referred to as "− (minus) side".

When the relative rotation angle θ is larger than 0°, the first end portion 13 and the second base end portion 24 compress the elastic claw 32 to transmit torque of the motor 130 from the first end portion 13 (first engagement member 10) to the second base end portion 24 (second engagement member 20).

Thus, the elastic claw 32 is compressed and deformed (elastically deformed), and the first end portion 13 and the second base end portion 24 are not in direct contact with each other. This configuration prevents rattling noise from occurring between the first end portion 13 and the second base end portion 24. Additionally, since the elastic claw 32 is compressed and deformed to absorb the torque, the torque transmitted from the motor 130 to the worm 120 does not increase abruptly. This configuration prevents an abrupt increase in the torque that is being transmitted, and eliminates uncomfortability to the driver. Since the elastic claw 32 is compressed and deformed, the torque transmitted from the first engagement member 10 to the second engagement member 20 is smaller than the torque in the comparative example in which no elastic claw 32 is provided and in which the first engagement member 10 and the second engagement member 20 are in direct contact with each other (see FIG. 8).

"Relative Rotation Angle θ=Predetermined Angle θ1"

When the relative rotation angle θ reaches the predetermined angle θ1, the elastic claw 32 is further compressed, and in the circumferential direction, the first base end portion 14 and the second end portion 23 are in direct contact (touch) with each other. This causes the first engagement member 10 and the second engagement member 20 to be integrated to each other in the circumferential direction, and causes the first engagement member 10 and the second engagement member 20 to rotate integrally. That is, the output shaft 131 of the motor 130, the first engagement member 10, the second engagement member 20, and worm 120 rotate integrally. This configuration ensures that the torque generated at the motor 130 is transmitted to the worm 120 as it is.

In this case, the torque (total torque) transmitted between the first engagement member 10 and the second engagement member 20 is obtained by the sum of: a first torque, which is transmitted between the first base end portion 14 and the second end portion 23 in direct contact with each other; and a second torque, which is transmitted between the first end portion 13 and the second base end portion 24, which sandwich the elastic claw 32 (total torque=first torque+second torque). The magnitude of the first torque is proportional to the area over which the first base end portion 14 and the second end portion 23 are in direct contact with each other. The magnitude of the second torque is proportional to a cross-sectional area in the circumferential direction of the elastic claw 32.

Since the elastic claw 32 is compressed and deformed, it is likely that the second torque is smaller than the first torque. In this respect, it is preferable that variation in the torques in the radial direction is as small as possible. That is, it is preferable that the cross-sectional area in the circumferential direction of the elastic claw 32 is larger than the direct contact area, over which the first base end portion 14 and the second end portion 23 are in direct contact with each other, so as to make the first torque and the second torque equal to each other. Another possible configuration is that the second torque is significantly larger than the first torque.

"Summary"

As has been described hereinbefore, after the motor 130 starts rotation, the first end portion 13 and the second base end portion 24 sandwich the elastic claw 32, that is, are not in direct contact with each other. This configuration prevents rattling noise from occurring between the first engagement member 10 and the second engagement member 20, and prevents an abrupt increase in the torque that is being transmitted. This configuration eliminates uncomfortability to the driver in terms of steering feeling, and makes the first engagement member 10 and the second engagement member 20 less likely to be broken or damaged in some other manner.

When the relative rotation angle θ reaches the predetermined angle θ1, the first base end portion 14 and the second end portion 23 are in direct contact with each other, and thus the elastic claw 32 is not compressed or deformed any further. This configuration ensures that the compressive force subsequently applied to the elastic claw 32 does not increase, making the elastic claw 32 less likely to be damaged, resulting in improved durability.

<<Modifications>>

While the first embodiment of the present invention has been described above, the present invention is not limited to the first embodiment. The present invention may be modified as described below or may be conveniently combined with the configurations of later-described embodiments.

In the above described embodiment, the worm 120 is described as a motive power input member (transmission member), to which motive power is input. Other examples include a bevel gear (bevel wheel), a spur gear (spur wheel), a pinion gear, a helical gear (spiral gear), and a double helical gear (herringbone gear).

In the above described embodiment, the electric motor 130 is described as a motive power output device, which outputs the motive power. Other examples include a configuration in which the motive power output device is of the hydraulic type.

In the above described embodiment, the electric power steering device 200 is described as being of the pinion-assist type. Other examples include a configuration in which the electric power steering device 200 is of the column-assist type or the rack-assist type. In addition, the joint structure 1 may be applied to other devices than the electric power steering device 200.

<<Second Embodiment>>

Figure 9:
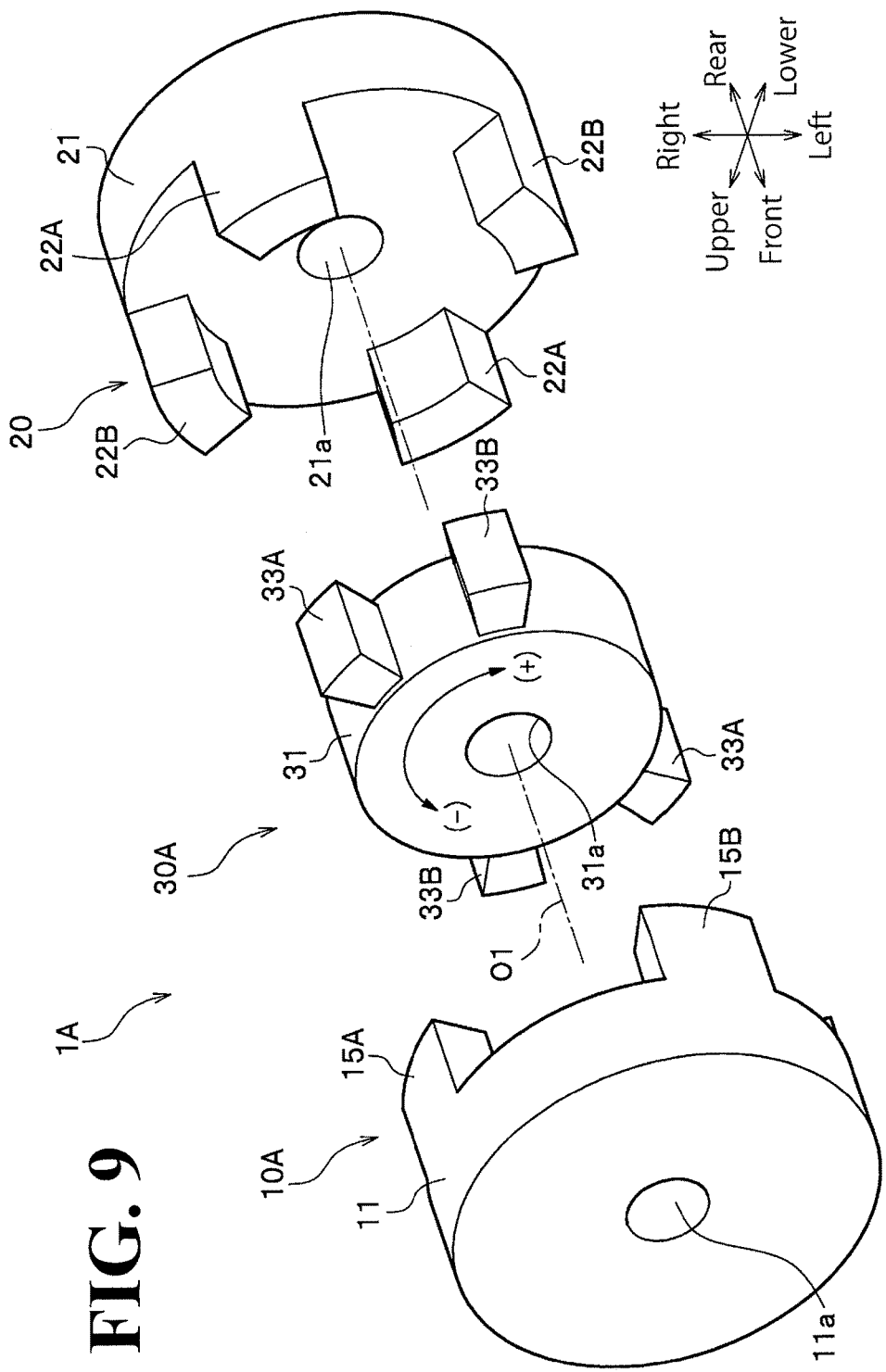
FIG. 9 is an exploded perspective view of a joint structure according to a second embodiment.
Figure 10:
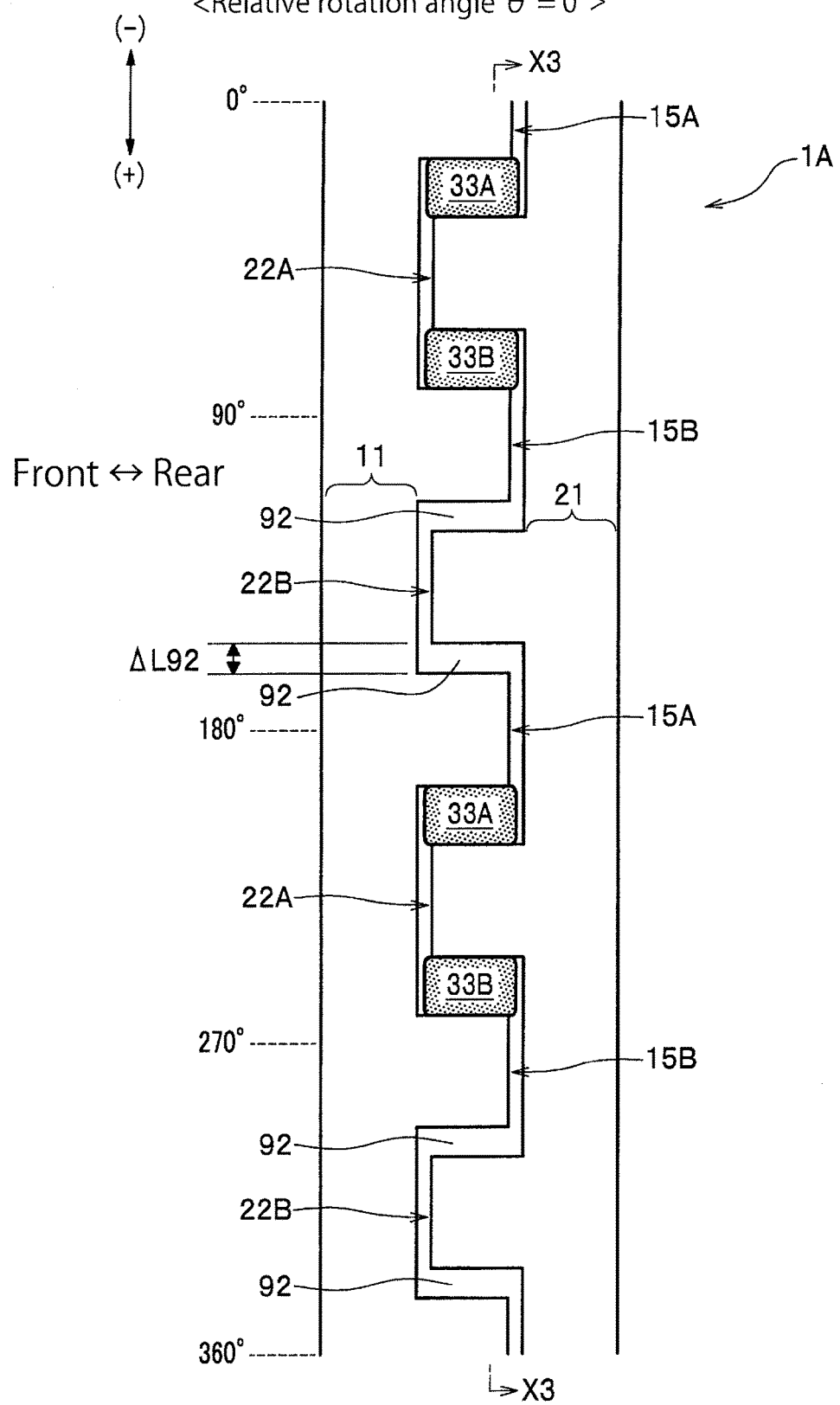
FIG. 10 is a view of the outer surface of the joint structure according to the second embodiment.
Figure 11:
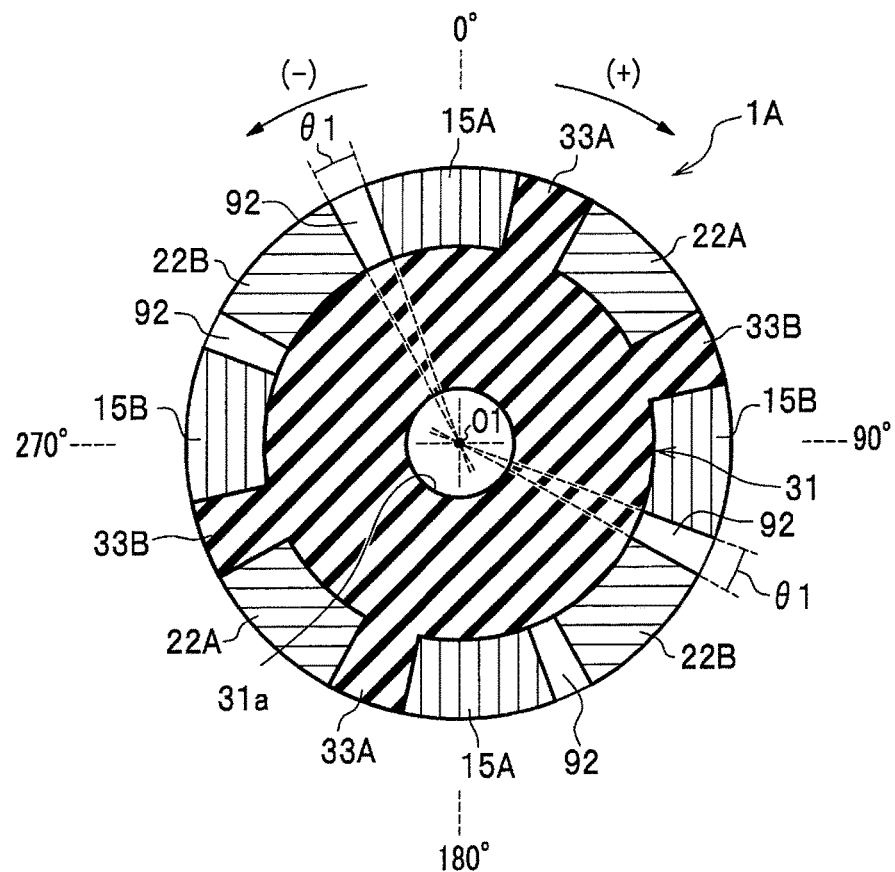
FIG. 11 is a round cross-sectional view of the joint structure according to the second embodiment taken along the line X3-X3 of FIG. 10.

Next, a second embodiment of the present invention will be described with reference to FIG. 9 to FIG. 11. The following description will focus on those respects different from the first embodiment.

<<Configuration of the Joint Structure>>

A joint structure 1A according to the second embodiment includes a first engagement member 10A, the second engagement member 20, and an elastic member 30A.

<First Engagement Member>

The first engagement member 10A includes the first body 11 and four first engagement claws that extend rearward from the first body 11 and that are disposed at equal intervals in the circumferential direction. Here, for convenience of description, the four first engagement claws will be referred to as a first engagement claw 15A, a first engagement claw 15B, a first engagement claw 15A, and a first engagement claw 15B in the circumferential direction.

<First Engagement Member—First Engagement Claw>

Figure 4:
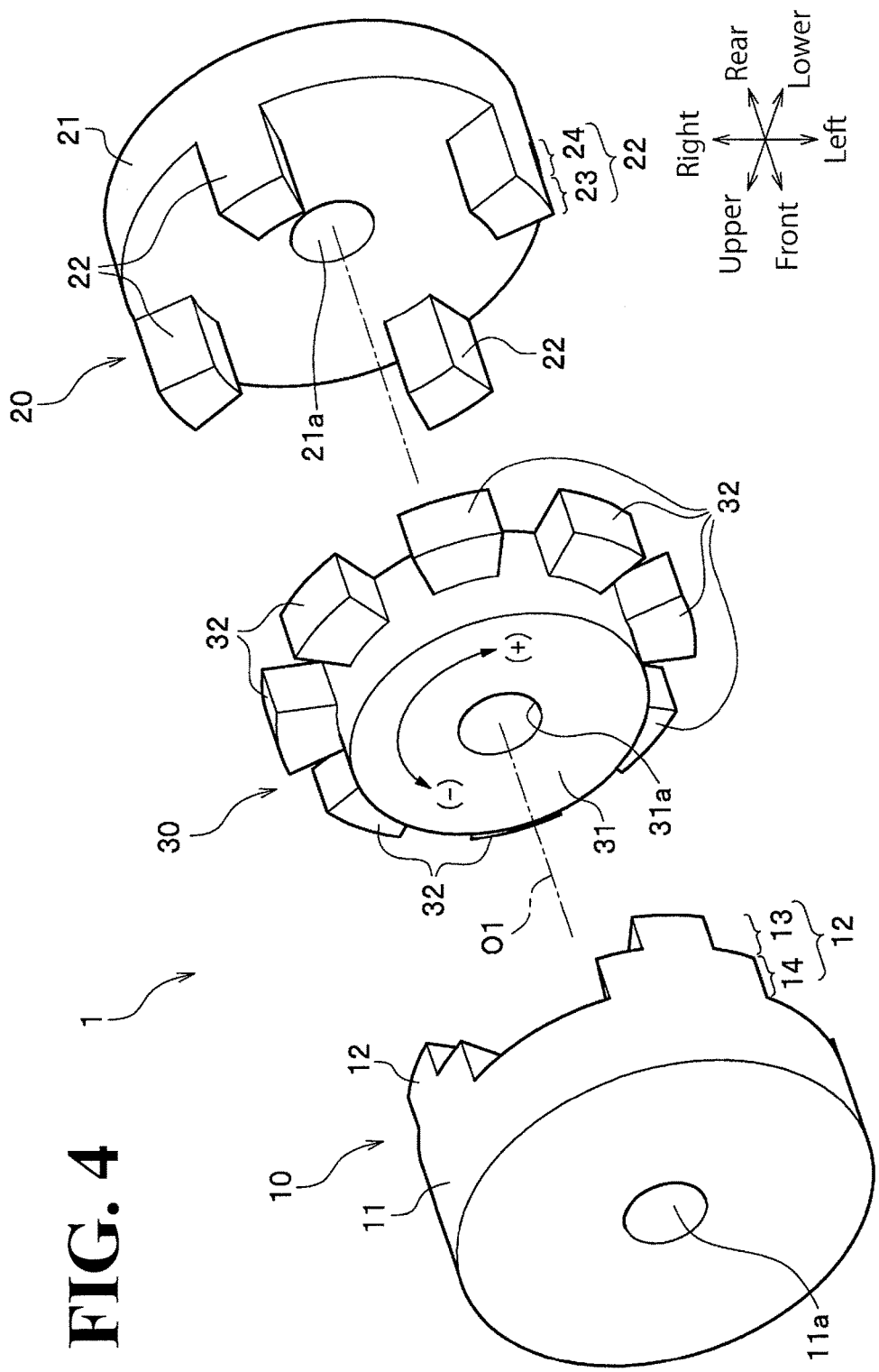
FIG. 4 is an exploded perspective view of the joint structure according to the first embodiment.

A circumferential length (width) of the first engagement claw 15A and the first engagement claw 15B is uniform in the axial direction, instead of being stepped as is the case of the first engagement claw 12 (see FIG. 4 and FIG. 5).

<Second Engagement Member>

The second engagement member 20 includes the second body 21 and four second engagement claws that extend frontward from the second body 21 and that are disposed at equal intervals in the circumferential direction. Here, for convenience of description, the four second engagement claws will be referred to as a second engagement claw 22A, a second engagement claw 22B, a second engagement claw 22A, and a second engagement claw 22B in the circumferential direction.

<Elastic Member>

The elastic member 30A includes an elastic member body 31 and four elastic claws that extend radially outward from the outer circumferential surface of the elastic member body 31. Here, for convenience of description, the four elastic claws are referred to an elastic claw 33A, an elastic claw 33B, an elastic claw 33A, and an elastic claw 33B in the circumferential direction.

<Elastic Member—Elastic Claw>

The elastic claw 33A and the elastic claw 33B are protruding pieces that are formed on the outer circumferential surface of the elastic member body 31 and that are elongated quadrilateral prism pieces extending in the axial direction. The axial direction lengths of the elastic claw 33A and the elastic claw 33B are set at the axial direction length of the elastic member body 31. The elastic claw 33A is sandwiched between the first engagement claw 15A and the second engagement claw 22A in the circumferential direction (see FIG. 10 and FIG. 11). The elastic claw 33B is sandwiched between the first engagement claw 15B and the second engagement claw 22A in the circumferential direction (see FIG. 10 and FIG. 11).

<<Operations and Effects of the Joint Structure>>

Operations and effects of the joint structure 1A will be described.

"Relative Rotation Angle θ=0°"

The case where the relative rotation angle θ is 0° will be described.

In the circumferential direction of a round cross-section (cross-section taken along the line X3-X3) including the elastic claw 33A and the elastic claw 33B, the first engagement claw 15A, the elastic claw 33A, the second engagement claw 22A, the elastic claw 33B, the first engagement claw 15B, a slit 92, the second engagement claw 22B, the slit 92, the first engagement claw 15A, the elastic claw 33A, the second engagement claw 22A, the elastic claw 33B, the first engagement claw 15B, and the slit 92 are aligned in this order.

The elastic claw 33A is not compressed between the first engagement claw 15A and the second engagement claw 22A, even though the elastic claw 33A is in contact with the first engagement claw 15A and the second engagement claw 22A. The same applies to the elastic claw 33B. On both sides in the circumferential direction of the second engagement claw 22B, the slits 92 are formed, each having a circumferential length of ΔL92. The central angle of the slit 92 is set at the predetermined angle θ1.

"0°<Relative Rotation Angle θ<θ1"

The case where the motor 130 rotates on the "+ side", and "0°<the relative rotation angle θ<θ1" will be described.

When the relative rotation angle θ is larger than 0°, the first engagement claw 15A and the second engagement claw 22A compress the elastic claw 33A, and this causes torque to be transmitted from the first engagement member 10A to the second engagement member 20. Thus, the first engagement claw 15A and the second engagement claw 22A compress and deform the elastic claw 33A, and the first engagement claw 15A and the second engagement claw 22 are not in direct contact with each other. This configuration prevents rattling noise from occurring between the first engagement claw 15A and the second engagement claw 22A, and prevents an abrupt increase in the torque that is being transmitted.

"Relative Rotation Angle θ=Predetermined Angle θ1"

When the relative rotation angle θ reaches the predetermined angle θ1, the elastic claw 33 is further compressed, and in the circumferential direction, the first engagement claw 15B and the second engagement claw 22B are in direct contact (touch) with each other. This causes the first engagement member 10 and the second engagement member 20 to rotate integrally. That is, the output shaft 131 of the motor 130, the first engagement member 10A, the second engagement member 20, and worm 120 rotate integrally. This configuration ensures that the torque generated at the motor 130 is transmitted to the worm 120 as it is.

<<Third Embodiment>>

Figure 12:
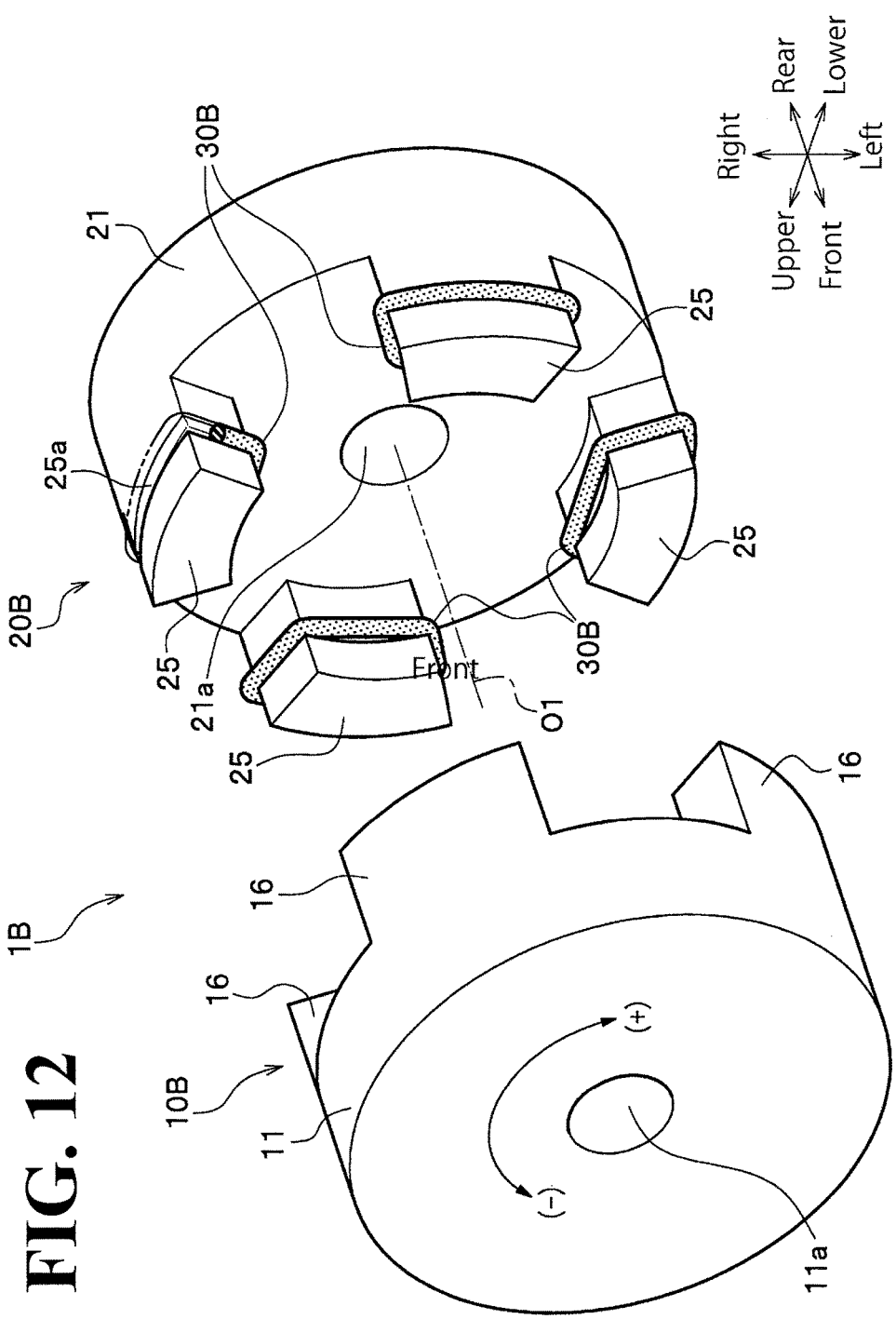
FIG. 12 is an exploded perspective view of a joint structure according to a third embodiment.
Figure 13:
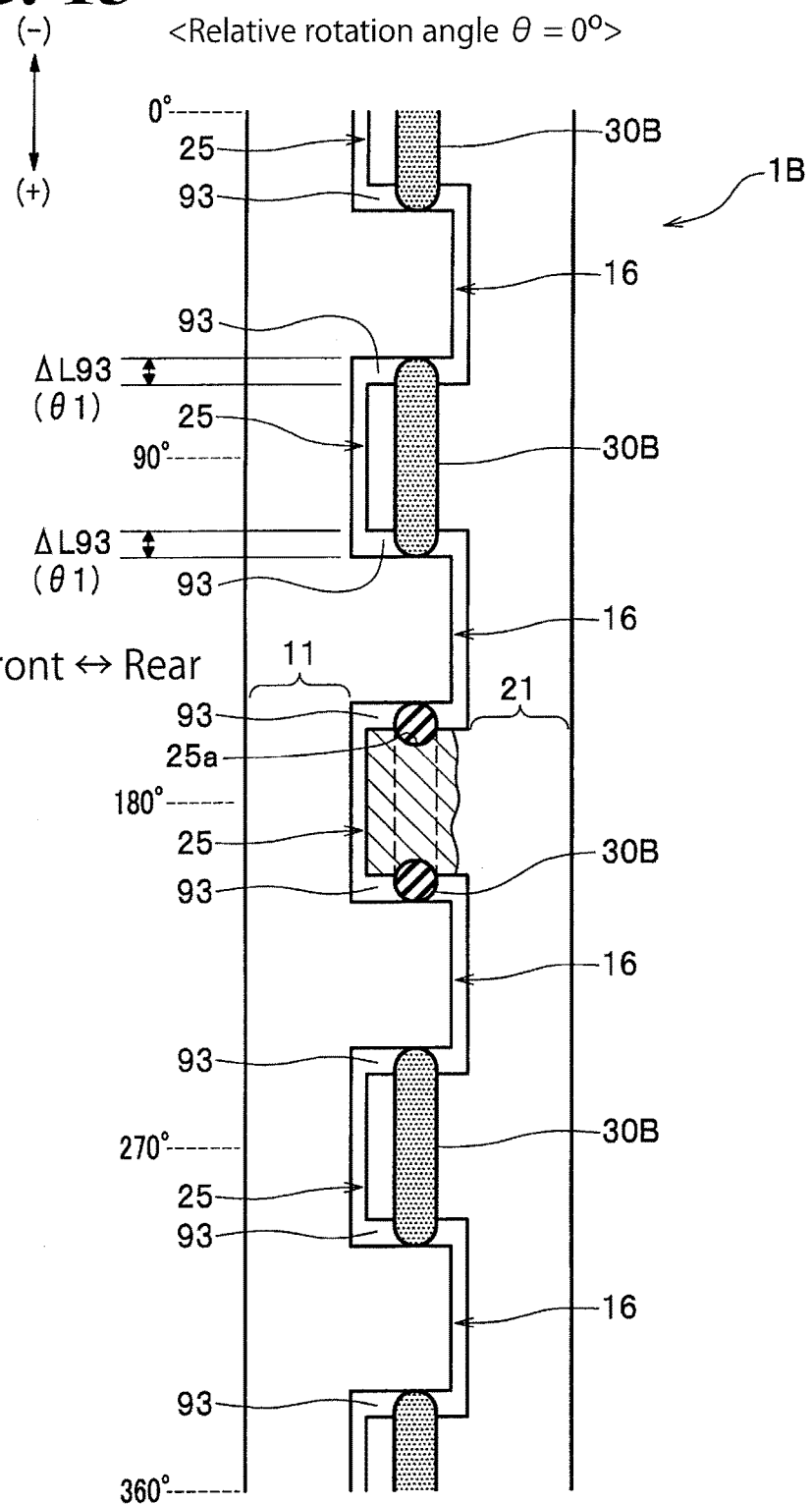
FIG. 13 is a view of the outer surface of the joint structure according to the third embodiment.

Next, a third embodiment of the present invention will be described with reference to FIG. 12 to FIG. 13. The following description will focus on those respects different from the first embodiment.

<<Configuration of the Joint Structure>>

A joint structure 1B according to the third embodiment includes a first engagement member 10B, a second engagement member 20B, and four elastic members 30B.

<First Engagement Member>

The first engagement member 10B includes the first body 11 and four first engagement claws 16, which extend from the first body 11 toward the second engagement member 20B. The four first engagement claws 16 are disposed at equal intervals in the circumferential direction.

<Second Engagement Member>

The second engagement member 20B includes the second body 21 and four second engagement claws 25, which extend from the second body 21 toward the first engagement member 10B. The four second engagement claws 25 are disposed at equal intervals in the circumferential direction.

<Second Engagement Member—Second Engagement Claw—Groove>

At an intermediate position in the axial direction on the outer circumferential surface of the second engagement claw 25, a groove 25a (second holding portion), which extends in the circumferential direction, is formed. The groove 25a is a groove for the elastic member 30B to be mounted in so that the elastic member 30B is held in the axial direction. That is, the elastic member 30B fitted in the groove 25a, and in this manner, the elastic member 30B is positioned with respect to the second engagement claw 25. The depth of the groove 25a is set at, for example, approximately ½ of the thickness of the elastic member 30B. The position of the groove 25a is not limited to the intermediate position in the axial direction of the second engagement claw 25. The groove 25a may be formed on the end side (front side) or the base end side (rear side) of the second engagement claw 25.

<Elastic Member>

The elastic member 30B is a member that is disposed between the first engagement claw 16 and the second engagement claw 25 in the circumferential direction to transmit torque between the first engagement claw 16 and the second engagement claw 25. The elastic member 30B is an annular member with a circular cross-section.

<<Operations and Effects of the Joint Structure>>

Operations and effects of the joint structure 1B will be described.

"Relative Rotation Angle θ=0°"

When the relative rotation angle θ is 0°, the elastic member 30B is not compressed between the first engagement claw 16 and the second engagement claw 25, even though the elastic member 30B is in contact with the first engagement claw 16 and the second engagement claw 25 in the circumferential direction. Specifically, the first engagement claw 16, the second engagement claw 25, the first engagement claw 16, the second engagement claw 25 and so forth are aligned in this order in the circumferential direction.

Between the first engagement claw 16 and a portion of the second engagement claw 25 at which the groove 25a is not formed, a slit 93 is formed, having a with a circumferential length of ΔL93. The central angle of the slit 93 is equal to the predetermined angle θ1.

"0°<Relative Rotation Angle θ<θ1"

When the relative rotation angle θ is larger than 0°, the first engagement claw 16 and the second engagement claw 25 compress the elastic claw 30B, and this causes torque to be transmitted from the first engagement member 10B to the second engagement member 20B. At the start of the torque transmission, the first engagement claw 16 and the second engagement claw 25 compress and deform the elastic member 30B, and the first engagement claw 16 and the second engagement claw 25 are not in direct contact with each other. This configuration prevents rattling noise from occurring between the first engagement claw 16 and the second engagement claw 25.

"Relative Rotation Angle θ=θ1"

When the relative rotation angle θ reaches the predetermined angle θ1, the elastic claw 30B is further compressed, and in the circumferential direction, the first engagement claw 16 and the portion of the second engagement claw 25 without the groove 25a (second direct contact portion) are in direct contact with each other. This causes the first engagement member 10B and the second engagement member 20B to be integrated to each other in the circumferential direction, and causes the first engagement member 10B and the second engagement member 20B to rotate integrally.

<<Fourth Embodiment>>

Next, a fourth embodiment of the present invention will be described with reference to FIG. 14 and FIG. 15.

Figure 14:
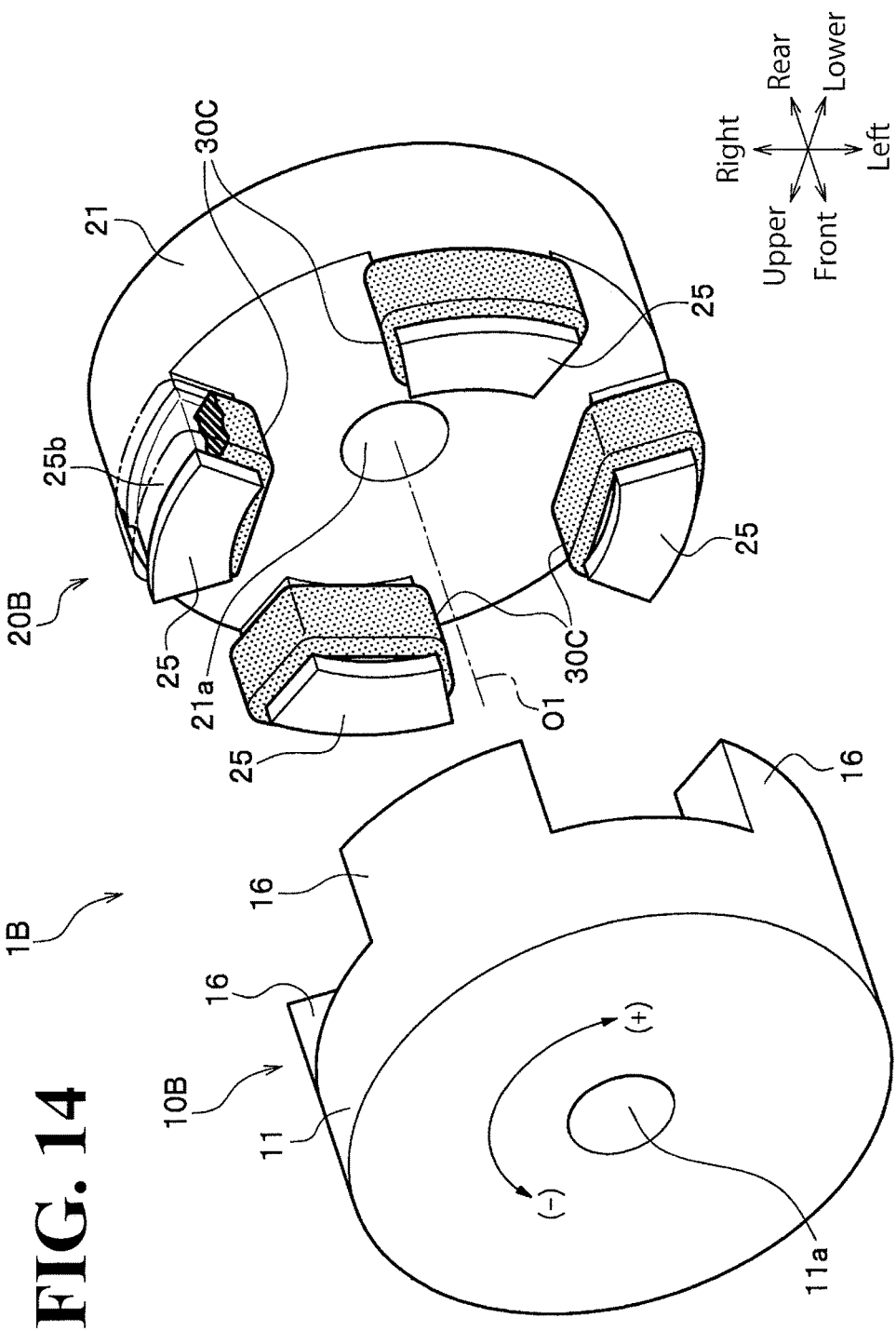
FIG. 14 is an exploded perspective view of a joint structure according to a fourth embodiment.
Figure 15:
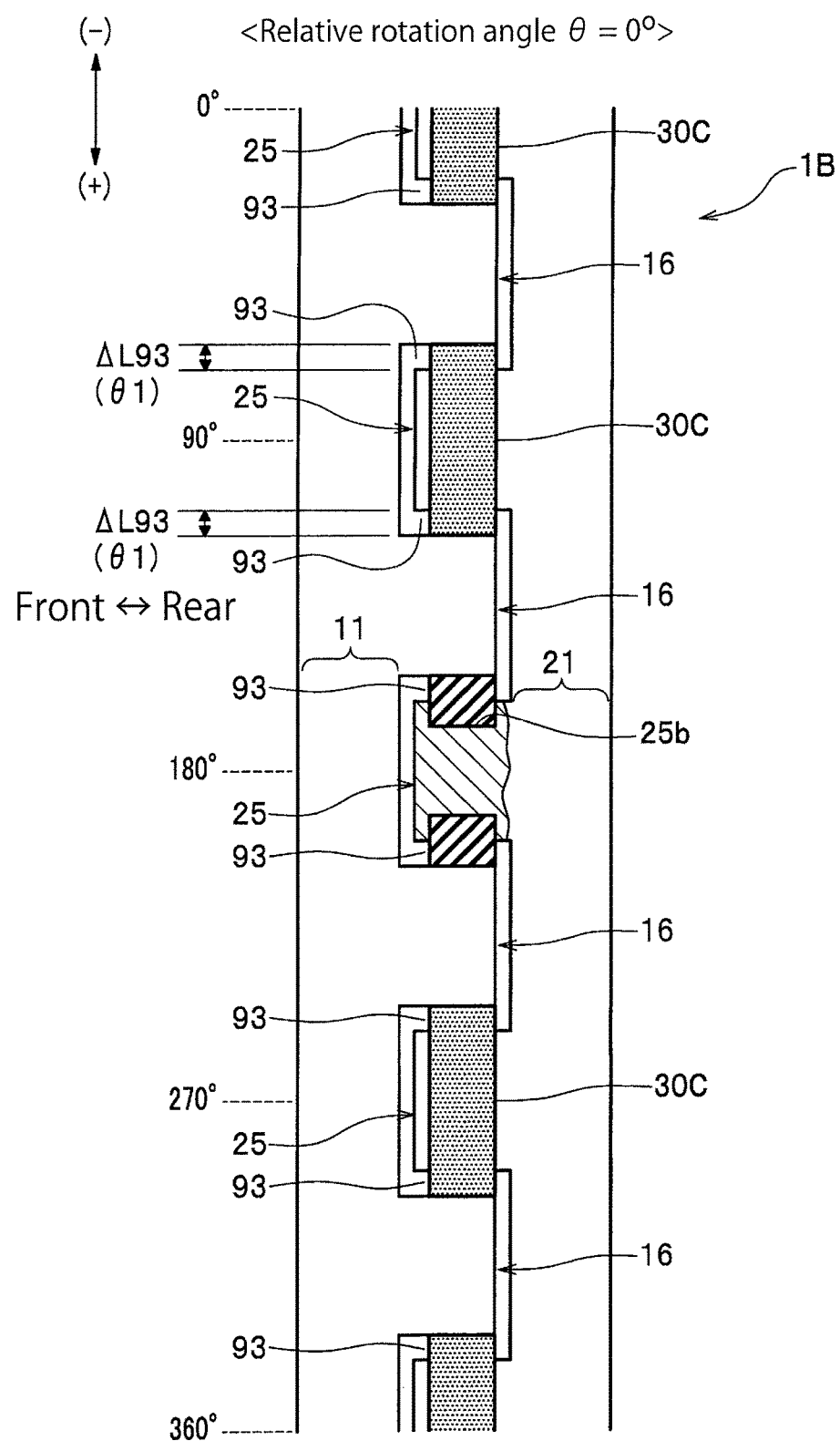
FIG. 15 is a view of the outer surface of the joint structure according to the fourth embodiment.

As illustrated in FIG. 14 and FIG. 15, the joint structure 1B according to the fourth embodiment includes, instead of the elastic member 30B, an endless belt shaped (belt shaped) elastic member 30C. That is, the elastic member 30C has a rectangular cross-section with a longitudinal side oriented in the axial direction (front-rear direction). Therefore, the contact area over which the elastic member 30C is in contact with the second engagement claw 25 or the first engagement claw 16 is larger than the contact area of the elastic member 30B (see FIG. 13), which has a circular cross-section. On the outer circumferential surface of the second engagement claw 25, a groove 25b (second holding portion) is formed, which has a rectangular cross-section that accords with the elastic member 30B.

In this configuration, the elastic member 30C has a larger contact area over which the elastic member 30C is in contact with the second engagement claw 25 or the first engagement claw 16. This reduces the contact pressure (pressure per unit area) acting on the elastic member 30C. As a result, the durability of the elastic member 30C improves.

<<Fifth Embodiment>>

Next, a fifth embodiment of the present invention will be described with reference to FIG. 16.

Figure 16:
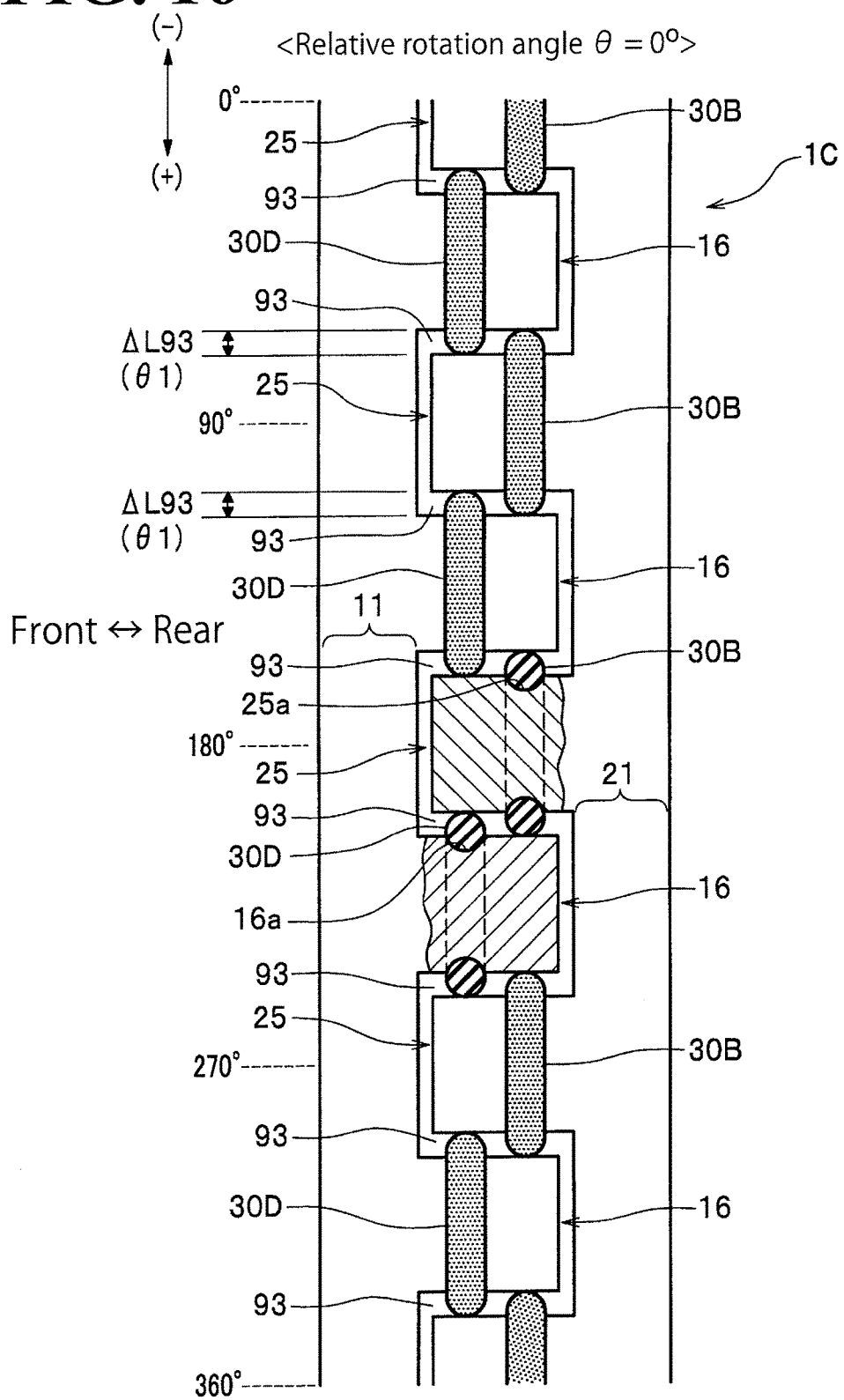
FIG. 16 is a view of the outer surface of a joint structure according to a fifth embodiment.

As illustrated in FIG. 16, in a joint structure 10 according to the fifth embodiment, an elastic member 30D, which is similar to the elastic member 30B, is attached to the first engagement claw 16. In the first engagement claw 16, a groove 16a (first holding portion) is formed, which holds the elastic member 30 in the axial direction. The elastic member 30B and the elastic member 30D are displaced from each other in the axial direction. Another possible configuration is that no elastic member 30B is provided, but only the elastic member 30D is provided.

<<Sixth Embodiment>>

Next, a sixth embodiment of the present invention will be described with reference to FIG. 17 and FIG. 18.

Figure 17:
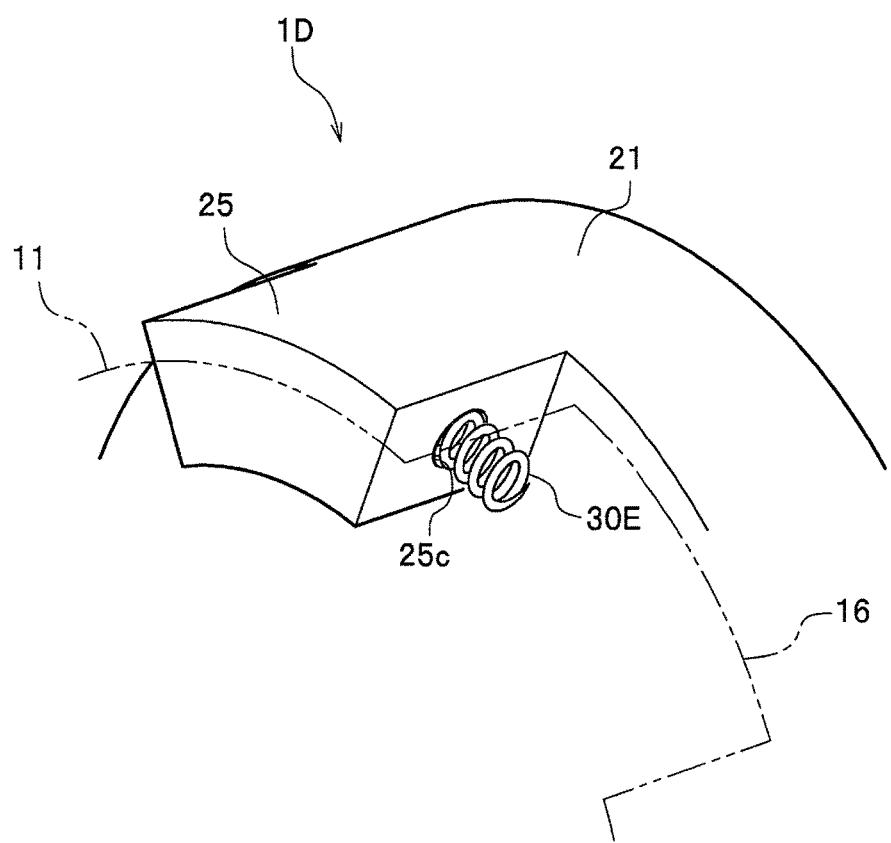
FIG. 17 is a perspective view of a joint structure according to a sixth embodiment.
Figure 18:
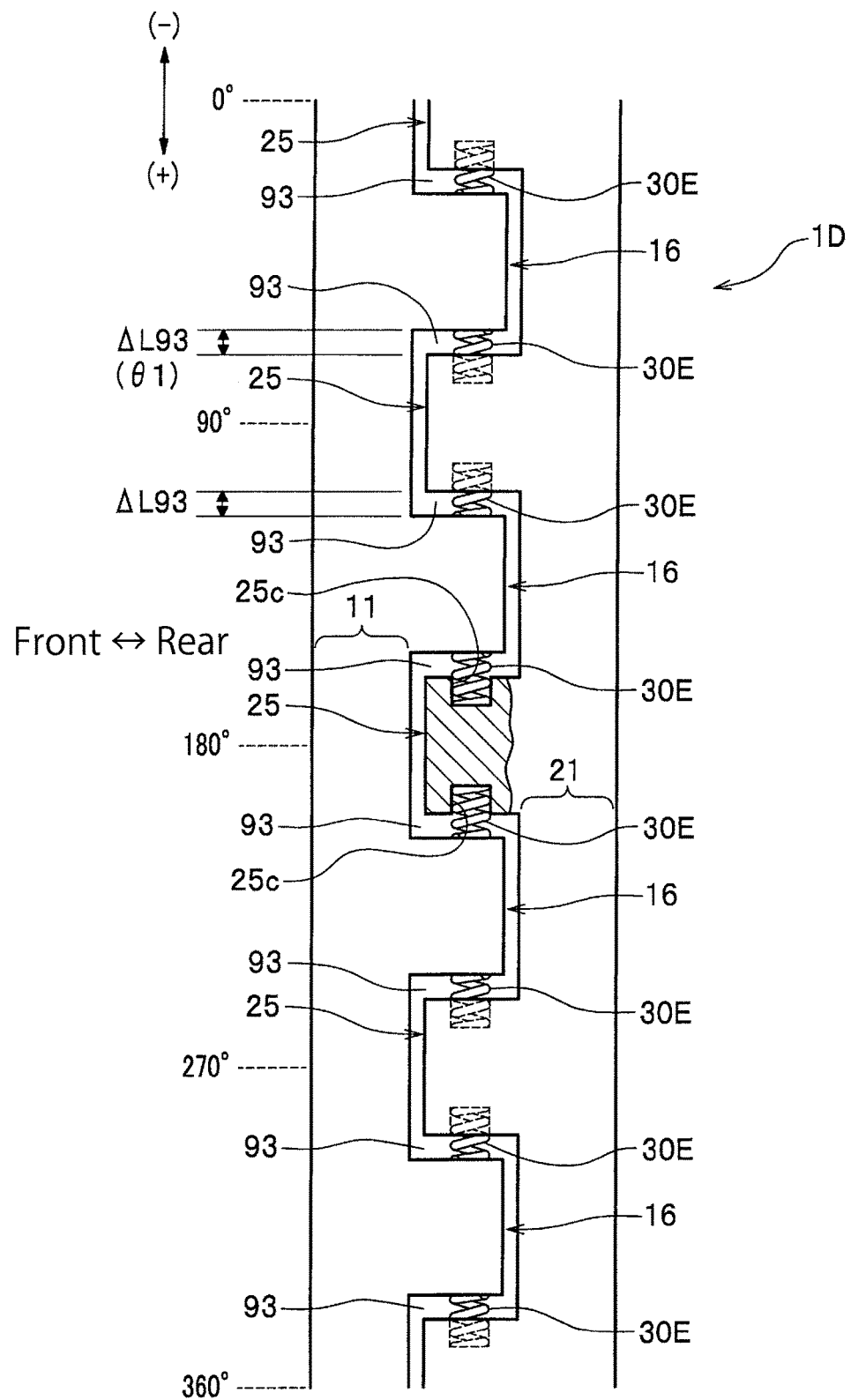
FIG. 18 is a view of the outer surface of the joint structure according to the sixth embodiment.

As illustrated in FIG. 17 and FIG. 18, a joint structure 1D according to the sixth embodiment includes a compression coil spring 30E (elastic member). The compression coil spring 30E is installed in each of holes 25c, which are formed on both side surfaces in the circumferential direction of the second engagement claw 25. That is, one end of the compression coil spring 30E is inserted in the hole 25c, and the other end of the compression coil spring 30E protrudes from the hole 25c and abuts a side surface in the circumferential direction of the first engagement claw 16. The first engagement claw 16 may also be provided with a hole for the compression coil spring 30E to be inserted in. Another possible configuration is to provide, instead of the compression coil spring 30E, an elastic member made of a rubber solid cylindrical body.

What is claimed is:

1. A joint structure comprising:
a first engagement member integral to a first rotation shaft;
a second engagement member integral to a second rotation shaft; and
an elastic member having an elasticity and disposed between the first engagement member and the second engagement member to transmit a rotational force between the first engagement member and the second engagement member,
wherein the first engagement member comprises;
a first body integral to the first rotation shaft, and
one or more first engagement portions extending from the first body toward the second engagement member in a direction of a rotation axis,
the second engagement member comprises;
a second body integral to the second rotation shaft, and
one or more second engagement portions extending from the second body toward the first engagement member in the direction of the rotation axis,
the elastic member is disposed between the first engagement portion and the second engagement portion in a circumferential direction,
when a relative rotation angle between the first engagement member and the second engagement member is less than a predetermined angle, the first engagement portion and the second engagement portion are not in direct contact with each other in the circumferential direction, and the rotational force is transmitted through the elastic member while the elastic member is being elastically deformed, and
when the relative rotation angle is equal to the predetermined angle, the first engagement portion and the second engagement portion are in direct contact with each other in the circumferential direction.

2. The joint structure according to claim 1, wherein the first engagement portion comprises
a first holding portion holding the elastic member in an axial direction, and a first direct contact portion in direct contact with the second engagement portion when the relative rotation angle is equal to the predetermined angle.

3. The joint structure according to claim 2, wherein the second engagement portion comprises
a second holding portion holding the elastic member in the axial direction, and
a second direct contact portion in direct contact with the first engagement portion when the relative rotation angle is equal to the predetermined angle.

4. A power steering device comprising the joint structure according to claim 3,
wherein the first rotation shaft is an output shaft of a motor configured to generate an assisting force, and
the second rotation shaft is a transmission member configured to transmit the assisting force to a steering device.

5. A power steering device comprising the joint structure according to claim 2,
wherein the first rotation shaft is an output shaft of a motor configured to generate an assisting force, and
the second rotation shaft is a transmission member configured to transmit the assisting force to a steering device.

6. The joint structure according to claim 1, wherein the second engagement portion comprises
a second holding portion holding the elastic member in an axial direction, and
a second direct contact portion in direct contact with the first engagement portion when the relative rotation angle is equal to the predetermined angle.

7. A power steering device comprising the joint structure according to claim 6,
wherein the first rotation shaft is an output shaft of a motor configured to generate an assisting force, and
the second rotation shaft is a transmission member configured to transmit the assisting force to a steering device.

8. A power steering device comprising the joint structure according to claim 1,
wherein the first rotation shaft is an output shaft of a motor configured to generate an assisting force, and
the second rotation shaft is a transmission member configured to transmit the assisting force to a steering device.

9. The joint structure according to claim 1, wherein
the first engagement member has a first spline hole on a central axis of the first body,
the second engagement member has a second spline hole on a central axis of the second body, and
the first spline hole is provided coaxially with the second spline hole.

10. The joint structure according to claim 9, wherein
the first rotation shaft and the first spline hole are spline-connected to each other.

11. The joint structure according to claim 9, wherein
the second rotation shaft has a spline shaft portion extending in the axial direction, and
the spline shaft portion is spline-connected to the second spline hole so that the second body is fixed to the spline shaft portion.

* * * * *